July 6, 1954 — R. M. SEDDON — 2,683,034
RUBBER COMPRESSION SPRING
Filed Dec. 8, 1949 — 2 Sheets-Sheet 1

INVENTOR
Robert Maxwell Seddon
by Benj. T. Rauber
his attorney

July 6, 1954  R. M. SEDDON  2,683,034
RUBBER COMPRESSION SPRING
Filed Dec. 8, 1949  2 Sheets-Sheet 2

INVENTOR
Robert Maxwell Seddon
by Benj. T. Rauber
his attorney

Patented July 6, 1954

2,683,034

UNITED STATES PATENT OFFICE 2,683,034

RUBBER COMPRESSION SPRING

Robert Maxwell Seddon, Walmley, Sutton Coldfield, England, assignor to Dunlop Rubber Company Limited, London, England, a British company Application December 8, 1949, Serial No. 131,851

Claims priority, application Great Britain December 9, 1948

16 Claims. (Cl. 267—63)

This invention relates to improvements in springs incorporating a natural or synthetic rubber compression member and is particularly applicable to suspension systems.

Rubber compression springs for motor vehicles, e. g. in wheel suspensions for motor cars, are known having one member adapted to be attached to a fixed part of the vehicle, a second member to be attached to the wheel assembly and a cushioning member of rubber adapted to absorb the shock when the wheel passes over irregularities of the road surface. In one type of such suspension systems the rubber cushioning member is annular and is fitted loosely on a central rod attached to one of the members. It is desirable that under load the cushioning member should not bind on the central rod.

It is generally thought that when a resilient rubber annular member is compressed between its planar faces, the axial depth is decreased and, due to the radial expansion, the annulus expands radially both outwards and inwards, the outer diameter increasing and the diameter of the hole decreasing. I have found this to be incorrect particularly in members of substantial length since as the annulus is compressed the hole increases in diameter, the increase in the diameter of the hole being substantially proportional to the increase in compressive stress. This fact occasions certain disadvantages where a compression member comprising a column of rubber annuli is employed in suspension systems of the above type. For example, the holes in such members, which may be a sliding fit on the central rod in an uncompressed state, are, when under substantial load, deformed to a diameter considerably in excess of the rod. The members are thus unsupported throughout their length and tend to buckle and distort longitudinally, and the stresses in the column are unequally distributed throughout its length. This distortion may to a certain extent be limited by interposing spacing members, e. g. of hard rubber or metal, between the rubber annuli and thus localising the distortion. The disadvantages of this, however, are that such a measure not only increases the length of the device but also increases its weight and increases the high local stressing caused at regions adjacent the points of restriction of said spacing members.

It is the object of this invention to provide an improved rubber compression spring wherein the above disadvantages are overcome.

According to the present invention a compression spring comprises two members adapted for attachment one to each of two relatively movable bodies, one of which members comprises a rigid guiding member extending axially through a tubular cushioning element, wherein the cushioning element has an internal cross-section in the unstressed condition less than the external cross-section of the rigid guiding member and greater than that of said external cross-section when the cushioning member is compressed under a load equal to the maximum the spring is designed to carry.

Preferably the rigid guiding member is substantially circular in cross-section and the internal cross-section of the cushioning element is circular and such that it is a sliding fit on the rigid guiding member when the cushioning element is compressed under a load equivalent to the static load which the compression spring is designed to carry. With this preferred construction the rubber element is a snug fit on the guiding member when compressed by a load only slightly less than the static load, so that further loading will not make the cross-section substantially greater than that of the guide, thus substantially avoiding longitudinal distortion of the cushioning element. It is thus possible to make a cushioning element from longer annular rubber members and a smaller number of spacing members than has hitherto been possible, and in some cases the cushioning element may be made of a single thick walled rubber tube. As a consequence of reducing the number of spacing members (or of avoiding their use) there is a reduction in the weight and length of the device and also in the local high stressing caused at the region of restriction of said spacing members, as the stresses are distributed more evenly through the element.

It has also been found advantageous to use a rubber cushioning element having a circular internal cross-section in conjunction with a guiding member consisting of a round rod whose cross-section is not perfectly circular but which has a narrow flattened area extending for substantially the whole length of it. It is then found that when the compression spring is subjected to a dynamic load the surface of the rubber separates from the surface of the rod more readily than if the curvature of the latter were everywhere the same and the spring thus adjusts itself more rapidly to the changed conditions. The rigid guide may alternatively be a tube, and a similar result can then be obtained by perforating the tube.

Preferably, also, means are provided for lubricating the surface of the rigid guiding member where it contacts the rubber cushioning element; this may be done by providing adjacent one end of the spring a reservoir for a light lubricating oil and means for feeding it intermittently to the surface to be lubricated. If the guiding member is a round rod with a flattened area extending lengthwise, the channel formed between the flattened area and the rubber cushioning element when the latter is compressed may serve as a path for distributing the oil lengthwise of the rubber cushioning element when it is compressed under a dynamic load, excess oil being squeezed out of the channel for return to the reservoir when the dynamic load is removed. If the guiding member is a perforated tube, the oil may be delivered through the bore of the tube and the perforations therein.

The invention is most useful in vehicle suspensions, and more particularly in independent wheel suspensions for motor cars, shock absorbers for motor cycles and aircraft landing gear; it may also be used in aircraft tow bars.

Two embodiments of the invention will be described with reference to the accompanying drawings wherein.

Figure 1:
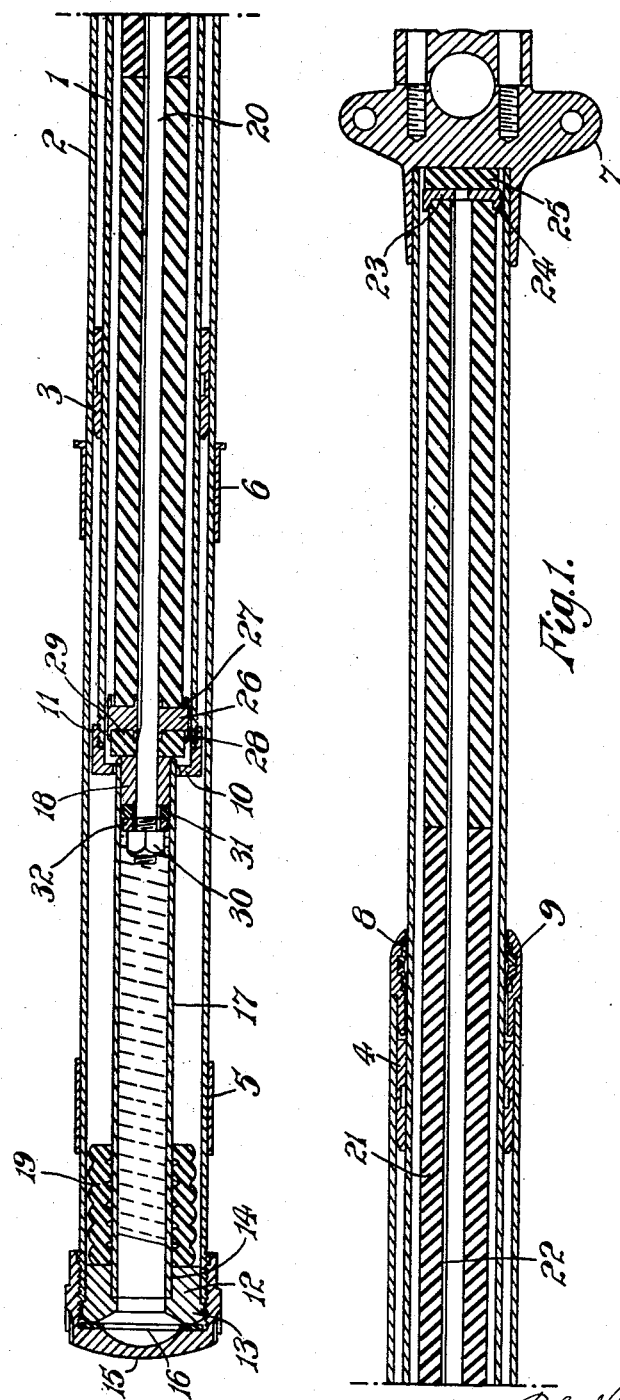
Figure 1 represents a longitudinal cross-section of a compression spring suitable for a motor cycle front suspension of the type described in my application Ser. No. 98,420 filed June 11, 1949.

Referring first to Figure 1 the compression spring comprises coaxial inner and outer telescopic tubular members 1 and 2 which are slidably mounted with respect to each other. The inner member 1 is spaced from the outer member 2 by bearing members 3 and 4 soldered to the outer member 2 and the inner member projects beyond the outer member at one end while its opposite end does not reach the corresponding end of the outer member. Reference numbers 5 and 6 indicate the cross members of the front suspension of the motor cycle to which the spring is fixed and 7 is the wheel axle support fixed to the projecting end of the inner member. The ends to which the cross members and axle support are attached will hereinafter be referred to as the upper and lower ends respectively. A conical metal cap 8 is fixed to the lower end of the tubular member 2 and in conjunction with seal 9 keeps road dirt and the like from the space between the two members 1 and 2.

The upper end of outer member 2 is threaded externally and is provided with a plug 12 having a threaded external flange 13 of the same diameter as the external diameter of member 2, the remainder of the plug projecting into the latter and having a stepped bore, the wide portion 14 of which is at the inward end of the plug. The plug is retained in position by a metal cap 15 having a skirt threaded internally to engage both the flange 13 of the plug 12 and the external thread of member 2. A rubber gasket 16 is interposed between the top of the plug 12 and cap 15 to give an oil-tight seal. A cylindrical tube 17 forming an oil reservoir is disposed between the top of the outer member 2 and the inner member 1, the upper end of the tube being soldered in the portion 14 of the stepped bore of plug 12 and the lower end projecting through a bore 11 in a cap 10 attached to the upper end of the inner member 1. At the lower end of the tube 17 a bored plug 18 is soldered to its interior. At the upper end the cylindrical tube 17 carries an annular rubber buffer 19, against which the cap 10 bears when the spring is fully compressed.

Extending axially of the inner member 1 and projecting beyond its upper end into tube 17 is a rod 20 forming a guide for a resilient cushioning element 21 formed of three coaxial tubular rubber components; the end faces of the middle component are cemented to the adjacent faces of the end components. The rod 20 is round for the major portion of its cross-section, but has a narrow flat 22 extending from its lower end to a short distance above the resilient cushioning element 21. The internal diameter of the cushioning element 21 is such that when the compression spring is built into the motor cycle and is under static load it is a sliding fit on the rounded rod 20 but is spaced from the flat 22, and when it is compressed further by the application of a dynamic load it is spaced from the rod. The element 21 may be for example 26 inches long and have a bore of 0.2 inch diameter when in the free state and, when compressed by a load slightly less than the static load it is designed to carry, have a length of 20 inches and a bore of approximately 0.25 inch diameter; the cushioning element is in this state a sliding fit over a rod 0.25 inch diameter. The rubber cushioning element has an outside diameter such that it does not foul the walls of the inner cylindrical member even when the maximum permitted dynamic load is supplied. The gap between the rubber and the flat 22 when the spring is under static load ensures that the surface of the rubber in contact with the rod moves away from it more rapidly when the dynamic load is applied than it would do if the rod were completely circular in section; the flat of the rod and the rubber also form together a channel for oil from the tube 17 acting as an oil reservoir.

On the lower end of rod 20 is secured a disc 23 having an upwardly extending flange 24 enclosing the lower end of rubber cushioning element 21 to prevent the edge of the latter expanding radially, i. e. "flowing," when the compression spring is under load. A rubber stop 25 is interposed between the end of the disc 23 and the wheel support 7. The upper part of the cushion assembly comprises a metal spacing member 26 at the top of the rubber member 21, which member 26 has a downwardly extending flange 27 enclosing the top of the rubber cushioning element 21 to prevent radial flow of the edge of the latter under load, and an upwardly extending flange 28 defining a recess to accommodate an annular resilient member 29 which in the position shown bears against the lower end of tube 17. The upper end of the flat 22 extends approximately half-way into the sealing ring 29.

The end of rod 20 projecting into the tube 17 is threaded and carries a locknut 30, and interposed between the locknut 30 and bored plug 18 is a rubber sealing ring 31 and a washer 32. It will be noted that the tube 17 is thus sealed at its lower end by means of the ring 31. When the compression spring is assembled on the motor bicycle a light lubricating oil is charged into the tube 17 and supplied intermittently to lubricate the interfaces of rod 20 and the rubber element 21 in a manner to be described subsequently.

The operation of the device can best be understood by considering the bottom end as fixed and the upper end as subjected to forces tending to contract or extend the device. In the first case (contraction of the device) the force will be transmitted to the resilient rubber element 21 through the cylinder 17 bearing on the ring 29 and the latter on member 26; in the second case the force will be transmitted through the same cylinder to the locknut 30 and thence through the rod 20 to the disc 23 situated at the bottom of the inner cylinder. In both cases the result is to subject the rubber to compression and thus oppose relative movement of the inner and outer members 1 and 2.

As the load on the device is increased and the rubber cushioning element 21 becomes compressed, the end of the rod 20 moves away from the bored plug 18 taking with it the nut 30, and the end of the flat 22 is brought past plug 18 into the interior of the tube 17. At the same time the compression of the rubber element 21 results in increase in its internal diameter, increasing the size of the channel between flat 22 and the rubber. Oil may therefore flow into the channel and lubricate the rod 20 and the internal surface of rubber element 21. As the load is removed on rebound of the spring the bore of the rubber element 21 contracts to the diameter of the rounded part of the rod, forcing oil back into the tube 17, and the rod moves downward so that the end of the flat 22 moves out of plug 18 and locknut 30 again forces the washer 32 against sealing ring 31 and the latter against the plug 18. Unless there is a rebound which extends the spring beyond the "no-load" position tube 17 does not separate from the sealing ring 29, and such rebound reinforces the seal between locknut 30 and plug 18, so that there is never a clear passage for oil both between rod 20 and plug 18 and between cylinder 17 and sealing ring 29. No significant transfer of oil from cylinder 17 to the gap between the rubber element 21 and the inner telescopic member 1 can thus occur.

Figure 2:
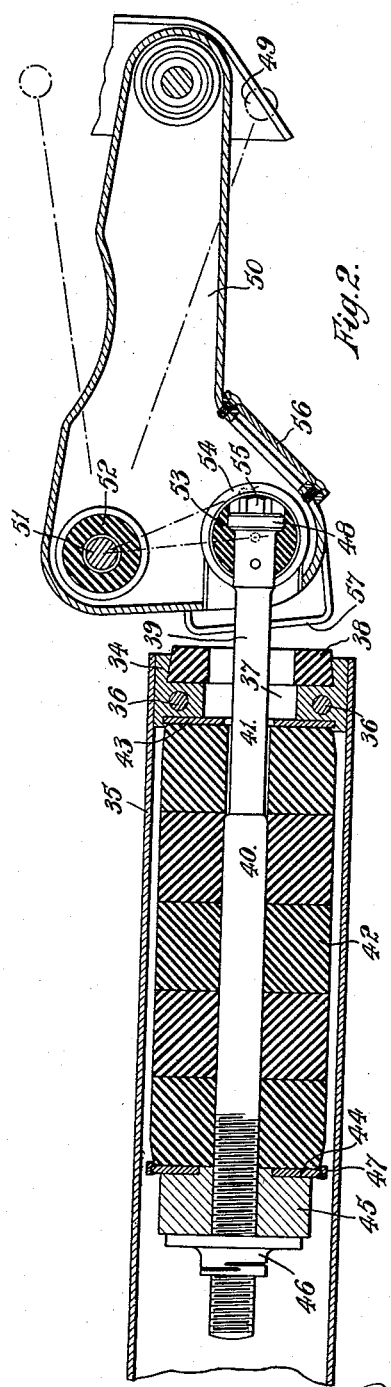
Figure 2 represents a part of an independent wheel suspension for a motor car incorporating a rubber compression spring.

Figure 2 is a view of part of a wheel suspension for a motor car incorporating a compression spring. The central rod 39 and locknut 46 thereon are in elevation, the remainder being shown in vertical section. The wheel suspension is shown with the spring compressed under a load equivalent to the static load.

The wheel suspension comprises two pivoted brackets mounted one vertically above the other and joined by a link carrying the axle of the wheel. In the drawing the lower bracket 50 is shown and part of the link 49. The bracket 50 is formed of two deep drawn pressings together forming a box-like compartment through which pass the bearing 51 covered with a rubber sleeve 52, by which bearing the bracket is pivoted to the chassis, and also a cylindrical pivot 53 by which the bracket is connected to the compression spring. One of the pressings of the bracket is removed to show the internal pivot members.

The spring comprises a metal plug 34 whose external shape is such that it fits in tubular casing 35 forming part of the chassis of the car, and is bolted thereto by bolts 36. The plug has a broad vertical slot 37 therein, and on the outside face of the plug is a peripheral recess around the slot in which is seated a rubber bush 38 projecting out of the plug. Coaxial with the casing is a guiding rod 39, one end of which is threaded and located within the casing 35 while the other end projects through the slot 37 in the plug 34 and terminates in a head 48 having a hexagonal portion 55. A tubular rubber cushioning element 42, formed of five rubber annuli cemented together, surrounds part of the rod and is located between two metal plates 43 and 44 carried by the rod; plate 43 is accommodated in a shallow seating in the inner face of plug 34 and the plate 44 is backed by a coaxial metal spacing member 45. A locknut 46 is carried on the end of rod 39 beyond the member 45 and bears against the latter. The major portion 40 of the rod 39 within the rubber cushioning element has a slightly greater diameter than the remaining portion 41 adjacent the plug 34.

The internal diameter of the rubber cushioning element 42 is such that in the position shown, i. e. with the spring compressed under static load, the rubber cushioning element is a sliding fit on the portion 40 of the rod and is spaced from the portion 41 of the rod adjacent the plug 34. The external diameter of the rubber cushioning element 42 is such that even when compressed under the maximum load the spring is designed to support, it is spaced from the casing 35. The plate 44 is also of less diameter than the casing and, because of this and the difference in diameter between cushioning element 42 and the portion 41 of the rod 39, displacement of the rod from the axial position is possible. A rubber ring 47 cemented to the periphery of the plate 44 acts as a buffer if the displacement becomes large enough for the plate to come into contact with the casing 35.

The cylindrical pivot 53 by which the rod 39 is connected to the bracket 50 is seated in a bushing 54 in the latter, and has a diametral bore shaped to receive the head 48 of the rod 39. The bracket is provided with an inspection cover 56 by which the rod 39 can be rotated if desired by means of the hexagonal portion 55 thereof. The bracket 50 also carries a stop 57 adapted to bear against the rubber bush 38.

The compression spring comprises plug 34, rod 39 and the parts mounted on the rod; these parts are assembled as a unit with the head of the rod 39 in the diametral bore of pivot 53 and locknut 46 is tightened so that in the "unloaded" position of the spring the stop 57 bears against the rubber bush 38 when the locknut just bears against the spacing member 45. The spring is mounted on the chassis by inserting the rubber cushioning element and the plug 34 in casing 35 and inserting the pin forming the pivot 51 for the bracket 50. The holes in plug 34 for bolts 36 will then be in register with the corresponding holes in the casing 35 and the bolts are then inserted. The bracket is then rotated about pivot 51 to compress rubber element 42 and bring the third bearing of the bracket into register with the bearing in link 49, and the two parts 49 and 50 are pivotally linked. Any minor adjustments in the stress on the rubber cushioning element necessary to bring the spring to the designed static load position are then made by removing the inspection cover 56 and rotating the rod by means of a box spanner engaging the hexagonal portion 55 of the head 54. The friction between the locknut 46 and the member 45 ensures that rotation of the rod relative to locknut 46 will result, enabling the adjustment to be effected.

Having described my invention what I claim is:

1. A compression spring having telescopic inner and outer members adapted to be connected one to each of two relatively movable bodies, a coaxial oil reservoir secured to and projecting inwardly from the end of the outer member forming one end of the spring, an annular orifice at the inward end of said reservoir, an annular stop secured to the inner telescopic member and disposed around said reservoir, a coaxial guide rod within said inner member having a head extending into the reservoir, means associated with said head adapted to form a fluid-tight seal with said orifice, a disc carried on the end of the rod remote from the head, an internal stop on the inner telescopic member forming an abutment for said disc, a tubular rubber cushioning element carried by said guide rod and located at one end thereof by the disc and at the other by the reservoir, the internal diameter of the rubber cushioning element being less in the unstressed condition than the diameter of the guide rod and greater than the diameter of the guide rod when the cushioning element is compressed under a load equal to the maximum the spring is designed to support, and said guide rod having a flat thereon extending from the disc to a point adjacent the end of the rubber cushioning element remote from the disc.

2. A wheel suspension for a motor car comprising a compression spring according to claim 1 associated with a member pivotally mounted on the chassis and movable about its pivot by vertical displacement of an associated wheel wherein movement of the member due to upward displacement of the wheel relative to the chassis causes movement of the rod of said spring to increase the degree of compression of the cushioning element.

3. A compression spring which comprises a tubular compression member of resilient material comprising at least one integral unit having a length equal to several times its external diameter, a guide rod extending through said compression member, the inner cross-sectional dimension of said member when unstressed being less than the cross-sectional dimension of said rod to grip said rod and greater than the external cross-sectional dimension of the guide rod without buckling when compressed axially under a load equal to the maximum spring load, and pressure applying members at opposite ends of said tubular member and movable axially of said guide rod toward each other to compress said tubular member.

4. The compression spring of claim 3 having a tube secured to one of said pressure applying members and enclosing and spaced from said tubular compression member.

5. The spring of claim 3 in which said guide rod is secured to one of said pressure applying members.

6. The spring of claim 3 in which one end of said guide rod is secured to one of said pressure applying members and which has an actuating member secured to the opposite end of said rod.

7. The spring of claim 3 in which said rod has a threaded engagement with one of said pressure applying members.

8. A compression spring which comprises a pair of relatively slidable telescoping tubes closed at their ends, a tubular extension from the free end of one of said tubes axially within said tube, a guide rod extending axially from the free end of the other tube to and within said extension and having a head within said extension, said extension having a stop between its free end and said head to engage said head, said rod having a pressure applying member secured thereto and abutting the free end of the tube, and a tubular compression member of resilient material and of lesser internal dimension when unstressed than the outer dimension of said rod mounted axially on said rod between the end of said extension and said pressure applying member and spaced from the interior surfaces of said tubes to be compressed axially and expanded transversely without buckling upon relative movement of said tubes in either direction.

9. A compression spring which comprises a pair of relatively slidable telescoping tubes closed at their ends, a tubular extension from the free end of one of said tubes axially within said tube, a guide rod of circular cross-section and having a flattened surface, said rod extending axially from the free end of the other tube to and within said extension and having a head within said extension, said extension having a stop between its free end and said head to engage said head, said rod having a pressure applying member secured thereto and abutting the free end of the tube, and a tubular compression member of resilient material and of lesser internal dimension when unstressed than the outer dimension of said rod mounted axially on said rod between the end of said extension and said pressure applying member and spaced from the interior surfaces of said tubes to be compressed axially and expanded transversely without buckling upon relative movement of said tubes in either direction.

10. A compression spring which comprises a pair of relatively slidable telescoping tubes closed at their ends, a tubular extension from the free end of one of said tubes axially within said tube, a guide rod of circular cross-section and having a flattened surface, said rod extending axially from the free end of the other tube to and within said extension and having a head within said extension, said extension having a stop between its free end and said head to engage said head, said rod having a pressure applying member secured thereto and abutting the free end of the tube, a tubular compression member of resilient material comprising at least one integral unit having a length equal to several times its external diameter and of lesser internal dimension when unstressed than the outer dimension of said rod mounted axially on said rod between the end of said extension and said pressure applying member and spaced from the interior surfaces of said tubes to be compressed axially and expanded transversely without buckling upon relative movement of said tubes in either direction and a sealing disc between the end of said extension and the adjacent end of said tubular compression member the surface of said rod being flattened from within said sealing disc to within said tubular compression member.

11. The compression spring of claim 10 in which the end of said tubular extension is closed about said rod to form an oil reservoir and in which said flattened part of said rod may extend into said reservoir when said tubes are compressed.

12. A compression spring having two members movable toward and from each other, a hollow rubber cushioning element extending between said members, a rod of circular cross-section and having a flattened surface extending longitudinally through said cushioning element, said rubber cushioning element having an internal cross-section in the unstressed condition less than the external cross-section of the guiding member and expansible under compression to an internal cross-section greater without buckling than the external cross-section of said guiding member, said rubber cushioning element having a sliding fit on said rod when under compression.

13. The compression spring of claim 12 having a lubricating oil reservoir communicating with the flattened surface of said rod when said rubber cushionin element is under longitudinal compression.

14. A compression spring comprising inner and outer telescopic tubular members, a rigid guide of substantially circular cross-section extending axially within said telescopic members, spaced abutments within said telescopic tubular members, one being supported in abutment with each of said members, a tubular rubber cushioning element comprising at least one integral unit having a length equal to several times its external diameter mounted on said guide between said abutments to be compressed as said abutments move toward each other, said guide being connected at one end to one of said abutments and at its other end having a slidable engagement with the other abutment when compressed and engaging said second abutment when said telescopic members are extended, said rubber element having an internal diameter in the unstressed condition less than the diameter of said guide, and expanding without buckling under compression to a diameter greater than the external diameter of said guide.

15. A compression spring comprising inner and outer telescopic tubular members, a rigid guide of substantially circular cross-section extending axially within said telescopic members, spaced abutments within said telescopic tubular members, one being supported in abutment with each of said members, the abutment of the outer telescopic member comprising a hollow oil reservoir with an orifice to receive said guide and forming with the latter an axially extending channel when the spring is compressed, a tubular rubber cushioning element mounted on said guide between said abutments to be compressed as said abutments move toward each other, said guide being connected at one end to one of said abutments and at its other end having a slidable engagement with the other abutment when compressed and engaging said second abutment when said telescopic members are extended, said rubber element having an internal diameter in the unstressed condition less than the diameter of said guide, and expanding without buckling under compression to a diameter greater than the external diameter of said guide.

16. A compression spring comprising two relatively movable bodies, a rod extending in the line of movement between said bodies with one end of said rod abutting one of said bodies, a plate secured to said rod at said abutting end, a stop secured to the other of said bodies and a tubular rubber cushioning element of a length several times its external diameter encircling said rod between the stop and the plate, the internal diameter of the cushioning element in the unstressed condition being less than the diameter of the rod and greater without buckling than the diameter when the cushioning element is compressed under a load equal to the maximum the spring is designed to support.

References Cited in the file of this patent

UNITED STATES PATENTS

| Number | Name | Date |
|---|---|---|
| 1,352,470 | Palmer | Sept. 14, 1920 |
| 1,602,922 | Midboe | Oct. 12, 1926 |
| 1,713,515 | Bechereau | May 21, 1929 |
| 1,829,280 | Hemphill | Oct. 27, 1931 |
| 1,930,098 | Hossfeld | Oct. 10, 1933 |
| 2,263,599 | Tucker | Nov. 25, 1941 |
| 2,445,723 | Brown | July 20, 1948 |
| 2,468,311 | Te Grotenhius | Apr. 26, 1949 |

FOREIGN PATENTS

| Number | Country | Date |
|---|---|---|
| 592,722 | Great Britain | Sept. 26, 1947 |
| 594,749 | Great Britain | Nov. 18, 1947 |
| 872,359 | France | Feb. 9, 1942 |